Feb. 17, 1953        H. J. PHILLIPS, JR        2,628,554
BALER TENSION ADJUSTING MECHANISM
Filed Oct. 23, 1947        2 SHEETS—SHEET 1
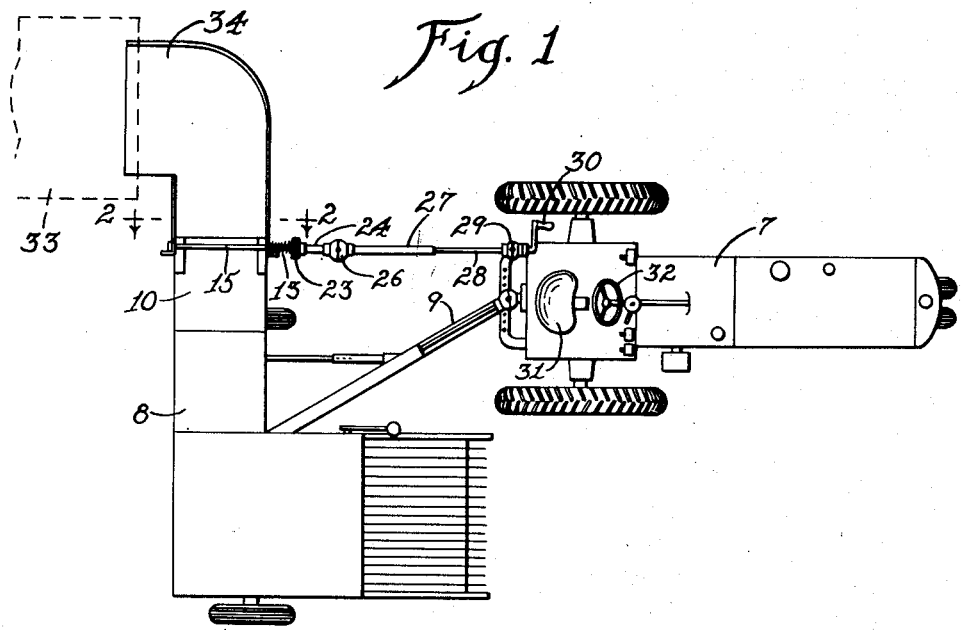
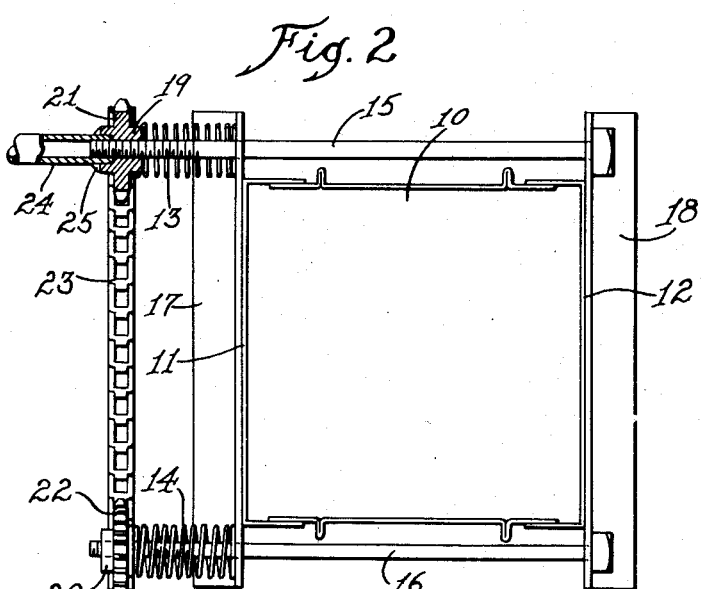
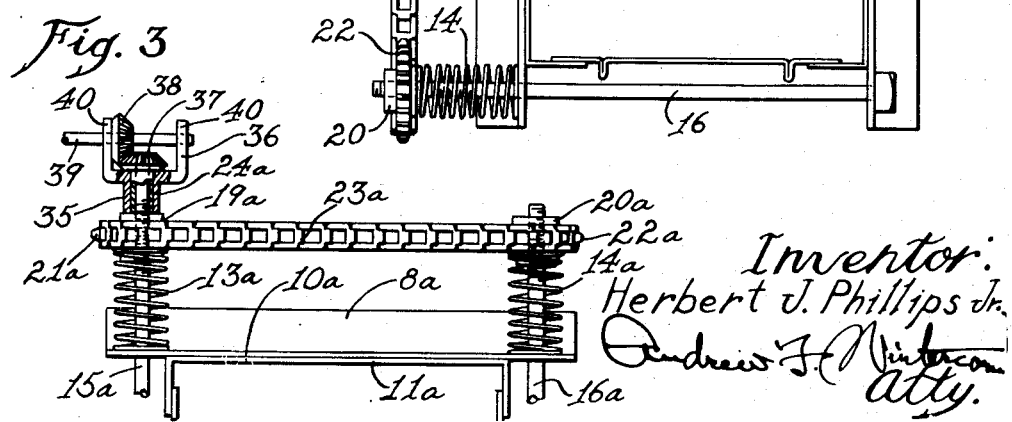
Inventor:
Herbert J. Phillips Jr.

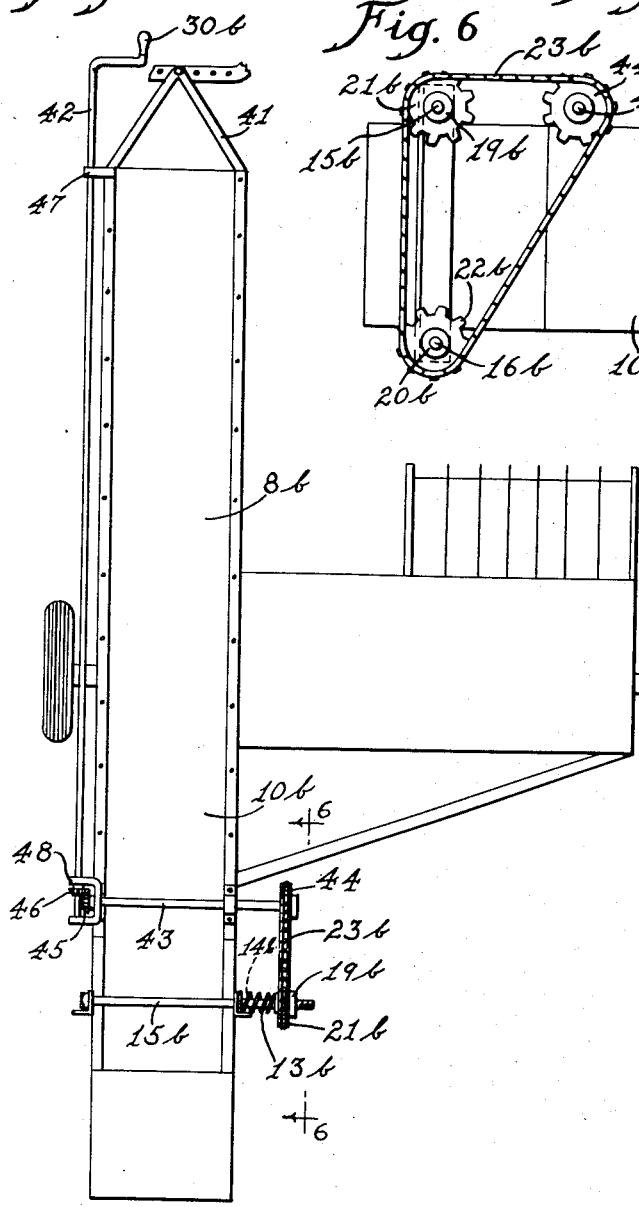

Patented Feb. 17, 1953

2,628,554

UNITED STATES PATENT OFFICE 2,628,554

BALER TENSION ADJUSTING MECHANISM

Herbert J. Phillips, Jr., Kaneville, Ill.

Application October 23, 1947, Serial No. 781,555

3 Claims. (Cl. 100—100)

This invention relates to balers, and is more particularly concerned with improvements in tension adjustments for the compressing devices for the chambers thereof.

It has been common practice to provide coiled compression springs on the tension rods associated with the compressor unit, to urge the opposite side walls of the baling chamber toward each other, the degree of compression of the springs being determined by the adjustment of hand nuts threaded against the springs on the tension rods. Now, owing to the difference in the hay in different areas on a given field, the tension adjustment has to be changed from time to time if the bales are to come anywhere near a standard weight per bale, and it has meant a considerable loss in time for the entire crew to stop the tractor in order that the hand nuts for the tension adjustment might be tightened or loosened so many times per hour. It is, therefore, the principal object of my invention to provide means operable from the driver's seat on the tractor for simultaneously adjusting the compression of the springs on both tension rods by remote control and without having to stop the tractor.

In the tension adjustment of my invention, the hand nuts previously employed are replaced by nuts on sprockets, and these sprockets are interconnected by a chain, and one of the sprockets is arranged to be operated by means of a crank through a shaft having a universal joint connection with the sprocket on a one-to-one ratio. This combination is sufficient for balers having tension rods horizontally disposed. Where the two rods are vertically disposed, the sprocket to which the drive is transmitted from the crank operated shaft has a bevel gear connected therewith meshing with the bevel gear driven by the shaft.

The invention is illustrated in the accompanying drawings, in which—

Fig. 1 is a plan view of a tractor and baler hitched thereto, showing the tension adjustment provided in accordance with my invention;

Fig. 2 is a section on the line 2—2 of Fig. 1, on a larger scale, showing the two tension adjusting nuts with sprockets thereon interconnected by a chain;

Fig. 3 is a fragmentary section of another baler showing the same type of adjustment but a different operating connection with the manually operated shaft;

Figs. 4 and 5 are plan view of two other balers, showing the application of my invention thereto in so far as the tension adjustment is concerned, and Fig. 6 is a side view of a portion of Fig. 4.

Similar reference numerals are applied to corresponding parts throughout the views.

Referring first to Figs. 1 and 2, the reference numeral 7 designates a tractor to which is hitched a baler 8, as indicated at 9. Indicated by numeral 10 is the baling chamber, the side walls 11 and 12 of which are yieldably urged toward each other at one end of the chamber by means of coiled compression springs 13 and 14 provided on tension rods 15 and 16 that extend through registering holes in the ends of crosspieces 17 and 18 provided on said side walls. Nuts 19 and 20 are threaded on the ends of the rods 15 and 16 and correspond to the hand nuts previously employed, and illustrated in Russell Patent 2,411,467, issued November 19, 1946, but these nuts in accordance with my invention have sprockets 21 and 22 integral therewith, and these sprockets are interconnected by a chain 23 to permit simultaneous operation of the two nuts in either direction. A sleeve 24 is welded, or otherwise suitably secured, to the hub of the sprocket 21, as indicated at 25, and has a loose telescoping fit over the threaded end of the tension rod 15, and this sleeve is connected by means of a universal joint 26 with another sleeve 27, in which a shaft 28 has a sliding driving connection, as by means of splines. The shaft 28 extends through a bearing 29 provided on the upper end of a bracket detachably secured in any suitable way to the frame of the tractor 7, a hand crank 30 being provided on the front end of the shaft, where it is within easy reach of the driver seated on the seat 31 and steering the tractor by means of the steering wheel 32.

In operation, the tension adjustment on the baler is made from time to time to vary the tightness of baling and the consequent ultimate weight of the bale, the tightness of baling being adjusted to suit the kind of hay being baled and its moisture content. Usually the workman who handles the bales as they are discharged from the baler and stacks them on the trailing wagon, the front portion of which is indicated in dotted lines at 33 behind the discharge chute 34 of the baler, is relied upon to tell by lifting the bales whether or not the tension adjustment is correct, and he tells the driver on the tractor what change in tension adjustment is desired and roughly how much of an adjustment, and the driver turns the crank 30 a half turn, or so, in a tightening-up or loosening-up direction, accordingly as he is instructed. Therein lies the importance of the one-to-one ratio of the connection between the crank and the one nut, and the chain and sprocket connection between the two nuts, so that they turn together. Because this adjustment can be made while the baler is in operation, there is no loss of time and adjustments can be made with less guesswork. Moreover, the fact that the adjustment can be made so readily tends toward more frequent adjustments and consequently much closer uniformity in the weight of the bales. Also, the fact that the adjusting nuts 19 and 20 are turned simultaneously and precisely to the same extent in a tightening or loosening direction eliminates any possibility of non-uniformity in the compression of the springs 13 and 14, and the baler is therefore assured of correct operation.

The tension rods 15 and 16 on the baler 8 are horizontally disposed, and the tension adjusting mechanism described above is satisfactory for that kind of baler. Fig. 3, however, illustrates another baler 8a, the chamber 10a of which has vertically disposed tension rods 15a and 16a cooperating with the springs 13a and 14a, which serve to urge the opposite side walls of the baling chamber inwardly toward each other, only the upper wall 11a being shown, the lower wall, corresponding to the wall 12 of Fig. 2, being on the portion broken away. Nuts 19a and 20a thread on the upper ends of these tension rods, and have sprockets 21a and 22a integral therewith, which are interconnected by a chain 23a, as in the first form described. However, the sleeve 24a, which is welded, or otherwise suitably secured, to the nut 19a to transmit drive thereto extends through a bearing 35 in a bracket 36, and is keyed, or otherwise suitably connected, to a bevel gear 37, which meshes with another bevel gear 38 that is keyed, or otherwise suitably connected, to a substantially horizontal shaft 39 received in spaced bearings 40 provided on the upper end of the bracket 36. Here again, a one-to-one drive ratio is afforded by bevel gears 37 and 38. The shaft 39 is operable by means of a hand crank on or adjacent the tractor, like the crank 30 of Fig. 1, the same being connected with said crank in any suitable manner, as, for example, through a shaft 28 splined, or otherwise suitably connected, with a sleeve 27, which, in turn, is connected through a universal joint 26 with the shaft 39. The operation of this tension adjusting mechanism is obviously like the operation of the other mechanism first described.

Another baler 8b, shown in Figs. 4 and 6, connects by means of its yoke 41 to the tractor, and has a long baling section 10b equipped with horizontal tension rods 15b and 16b, similarly as the baler of Figs. 1 and 2, but, inasmuch as these rods are in a plane at right angles to the axis of operation of the hand crank 30b, formed by an elongated shaft 42 that extends lengthwise on one side of the baling section 10b, it is not possible to make direct operating connections between the shaft 42 and either of the sprockets 21b and 22b to turn the same to adjust the nuts 19b and 20b, so as to increase or decrease the compression of the springs 13b and 14b. For that reason a cross-shaft 43 is provided on top of the discharge end of the baling section 10b in parallel relation to the upper tension rod 15b, having a sprocket 44 thereon, over which a chain 23b is extended interconnecting the three sprockets 21b, 22b, and 44, as shown in Fig. 6, and a bevel gear 45 is provided on the other end of the shaft 43 meshing with a bevel gear 46 provided on the rear end of the shaft 42. Again, a one-to-one drive ratio is provided by bevel gears 45 and 46. The shaft 42 is suitably supported in a bearing 47 on the front end of the baler and has the rear end thereof supported in a bearing bracket 48 at the point where the bevel gears 45 and 46 are meshed. It goes without saying that the operation of this tension adjusting mechanism is substantially the same as that of the other two described.

The baler 8c, shown in Fig. 5, is of still another design, having an elongated baling section 10c with vertically disposed tension rods 15c and 16c, as in Fig. 3. Nuts 19c and 20c threading on these rods, as in Fig. 3, have sprockets 21c and 22c integral therewith and interconnected by a chain 23c. The sprocket 21c is driven by a bevel gear 37c meshing on a one-to-one drive ratio with a bevel gear 38c keyed, or otherwise suitably secured, on the rear end of the shaft 39c. This shaft 39c has a crank 30c provided on its front end within easy reach of the driver on the tractor, the baler being hitched by the yoke 41c to the tractor. Suitable bearings 49 are provided to support the shaft 39c on the baler, and a bracket 36c is provided to support the rear end of the shaft and hold the bevel gears in meshing relation. It is obvious that the operation of this tension adjusting mechanism is substantially the same as the others.

It is believed the foregoing description conveys a good understanding of the objects and advantages of my invention. The appended claims have been drawn to cover all legitimate modifications and adaptations.

I claim:

1. In a tractor drawn hay baler, a baling chamber including opposed walls adapted to be compressed to retard the passage of baled material therethrough, a pair of spaced tension rods cooperating with the opposed walls to press the same toward each other, compression springs assembled on the rods and adapted to be compressed more or less to vary the compression of said chamber, said rods being threaded at one end, nuts adjustably threaded thereon, chain and sprocket type means interconnecting said nuts to turn together, and remotely controlled manually rotatable means operatively connected on a one to one ratio with said nuts and extending to the tractor for turning said nuts in either direction from the tractor during travel of the tractor and hay baler drawn thereby.

2. In combination with a tractor, and a baler drawn thereby, the baler having a baling chamber including opposed walls adapted to be compressed to retard the passage of baled material therethrough, a pair of spaced tension rods cooperating with the opposed walls to press the same towards each other, compression springs assembled on the rods and adapted to be compressed more or less to vary the compression of said chamber, said rods being threaded at one end, nuts adjustably threaded thereon, chain and sprocket type means interconnecting said nuts to turn together, and means operable by a hand crank disposed at the tractor, in remote relation to the baler, and operatively connected on a one to one ratio with at least one of said nuts for turning said nuts in either direction.

3. In a baler, a baling chamber including opposed walls adapted to be compressed to retard the passage of baled material therethrough, a pair of spaced tension rods cooperating with the opposed walls to press the same toward each other, compression springs assembled on the rods and adapted to be compressed more or less to vary the compression of said chamber, said rods being threaded at one end, nuts adjustably threaded thereon, chain and sprocket type means interconnecting said nuts to turn together, a bevel gear fixed to and arranged to turn one of said nuts, a second bevel gear meshing with the first bevel gear on a one to one ratio, and a shaft for turning said second bevel gear disposed in transverse relation to said tension rods and having a manually operable crank connected with its remote end for turning the same to turn the nuts in either direction.

HERBERT J. PHILLIPS, JR.

REFERENCES CITED

The following references are of record in the file of this patent:

UNITED STATES PATENTS

| Number | Name | Date |
|---|---|---|
| 459,630 | Hampton | Sept. 15, 1891 |
| 518,965 | Pearce | May 1, 1894 |
| 549,957 | Coles | Nov. 19, 1895 |
| 1,282,982 | Tellinghuisen | Oct. 29, 1918 |
| 1,496,364 | Bonnafoux | June 3, 1924 |
| 2,038,809 | Tallman | Apr. 28, 1936 |
| 2,318,229 | Jones | May 4, 1943 |
| 2,381,620 | Russell | Aug. 7, 1945 |
| 2,445,267 | Hilblom | July 13, 1948 |
| 2,458,994 | Hill | Jan. 11, 1949 |
| 2,478,012 | Raney | Aug. 2, 1949 |
| 2,499,615 | Tuft | Mar. 7, 1950 |

FOREIGN PATENTS

| Number | Country | Date |
|---|---|---|
| 803,028 | France | June 29, 1936 |